(12) United States Patent
Berndt

(10) Patent No.: US 9,771,837 B2
(45) Date of Patent: Sep. 26, 2017

(54) MULTI-POSITION CAMSHAFT PHASER WITH TWO ONE-WAY CLUTCHES

(71) Applicant: Schaeffler Technologies AG & Co. KG, Herzogenaurch (DE)

(72) Inventor: Eric Berndt, Whitefish Bay, WI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 112 days.

(21) Appl. No.: 14/941,726

(22) Filed: Nov. 16, 2015

(65) Prior Publication Data

US 2017/0138226 A1 May 18, 2017

(51) Int. Cl.
*F01L 1/34* (2006.01)
*F01L 1/344* (2006.01)
*F01L 1/352* (2006.01)

(52) U.S. Cl.
CPC ........... *F01L 1/34409* (2013.01); *F01L 1/352* (2013.01); *F01L 2250/06* (2013.01)

(58) Field of Classification Search
CPC .... F01L 1/34409; F01L 1/352; F01L 2250/06
See application file for complete search history.

(56) References Cited

U.S. PATENT DOCUMENTS

| | | | |
|---|---|---|---|
| 7,669,566 B2 | 3/2010 | Methley | |
| 2002/0139332 A1* | 10/2002 | Takenaka | F01L 1/34 123/90.17 |
| 2011/0162605 A1 | 7/2011 | Wigsten | |

* cited by examiner

*Primary Examiner* — Zelalem Eshete

(57) ABSTRACT

A camshaft phaser, including: an input component arranged to receive torque from an engine; an advance hub; an advance wedge plate radially disposed between the input component and the advance hub; and an actuation assembly including an advance pin arranged to be disposed in an advance channel for a camshaft and an actuator pin. For an advance mode: the actuator pin is arranged to radially displace the advance pin into non-rotatable connection with the advance hub; the advance hub is arranged to rotate, with respect to the input component, in a first circumferential direction; and the advance wedge plate is arranged to block rotation of the advance hub, with respect to the input component, in a second circumferential direction, opposite the first circumferential direction.

20 Claims, 12 Drawing Sheets

MULTI-POSITION CAMSHAFT PHASER WITH TWO ONE-WAY CLUTCHES

TECHNICAL FIELD

The present disclosure relates to camshaft phaser with two one-way cone clutches. An axially displaceable component is used to engage and disengage the one-way clutches to enable the phaser to shift between advance and retard modes.

BACKGROUND

It is known to use hydraulic fluid in an internal combustion engine to phase a camshaft for the engine. However, for some engines, in particular smaller engines for outboard motors, motorcycles, or all-terrain vehicles, the supply of hydraulic fluid is limited, which limits the use of the fluid for phasing and may compromise the operation of the engine and the camshaft phasing.

SUMMARY

According to aspects illustrated herein, there is provided a camshaft phaser, including: an input component arranged to receive torque from an engine; an advance hub; an advance wedge plate radially disposed between the input component and the advance hub; and an actuation assembly including an advance pin arranged to be disposed in an advance channel for a camshaft and an actuator pin. For an advance mode: the actuator pin is arranged to radially displace the advance pin into non-rotatable connection with the advance hub; the advance hub is arranged to rotate, with respect to the input component, in a first circumferential direction; and the advance wedge plate is arranged to block rotation of the advance hub, with respect to the input component, in a second circumferential direction, opposite the first circumferential direction.

According to aspects illustrated herein, there is provided a camshaft assembly, including: a camshaft including an advance channel and a retard channel; and a camshaft phaser. The camshaft phaser includes: an advance hub; a retard hub; and an actuation assembly including an advance pin disposed in the advance channel, a retard pin disposed in the retard channel, and an actuator pin. For an advance mode: the actuator pin is arranged to radially displace the advance pin into non-rotatable connection with the advance hub; the camshaft is arranged to rotate, with respect to the input component, in a first circumferential direction; and the advance hub is arranged to block rotation of the camshaft, with respect to the input component, in a second circumferential direction, opposite the first circumferential direction. For a retard mode: the actuator pin is arranged to radially displace the retard pin into non-rotatable connection with the retard hub; the camshaft is arranged to rotate, with respect to the input component, in the second circumferential direction; and the retard hub is arranged to block rotation of the camshaft, with respect to the input component in the first circumferential direction.

According to aspects illustrated herein, there is provided a method of phasing a camshaft, including: receiving, using an input component for a camshaft phaser, torque from an engine; for an advance mode radially displacing, with an actuator pin for an actuator assembly, an advance pin into non-rotatable connection with an advance hub for the camshaft phaser, the actuator pin located in an advance channel in the camshaft, rotating the camshaft, with respect to the input component, in a first circumferential direction, and blocking, with the advance hub, rotation of the camshaft, with respect to the input component, in a second circumferential direction, opposite the first circumferential direction; and for retard mode axially, displacing the actuator pin, radially displacing, with the actuator pin, a retard pin into non-rotatable connection with a retard hub for the camshaft phaser, the retard pin located in a retard channel in the camshaft, rotating the camshaft, with respect to the input component, in a second circumferential direction, opposite the first circumferential direction, and blocking, with the retard hub, rotation of the camshaft, with respect to the input component, in the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
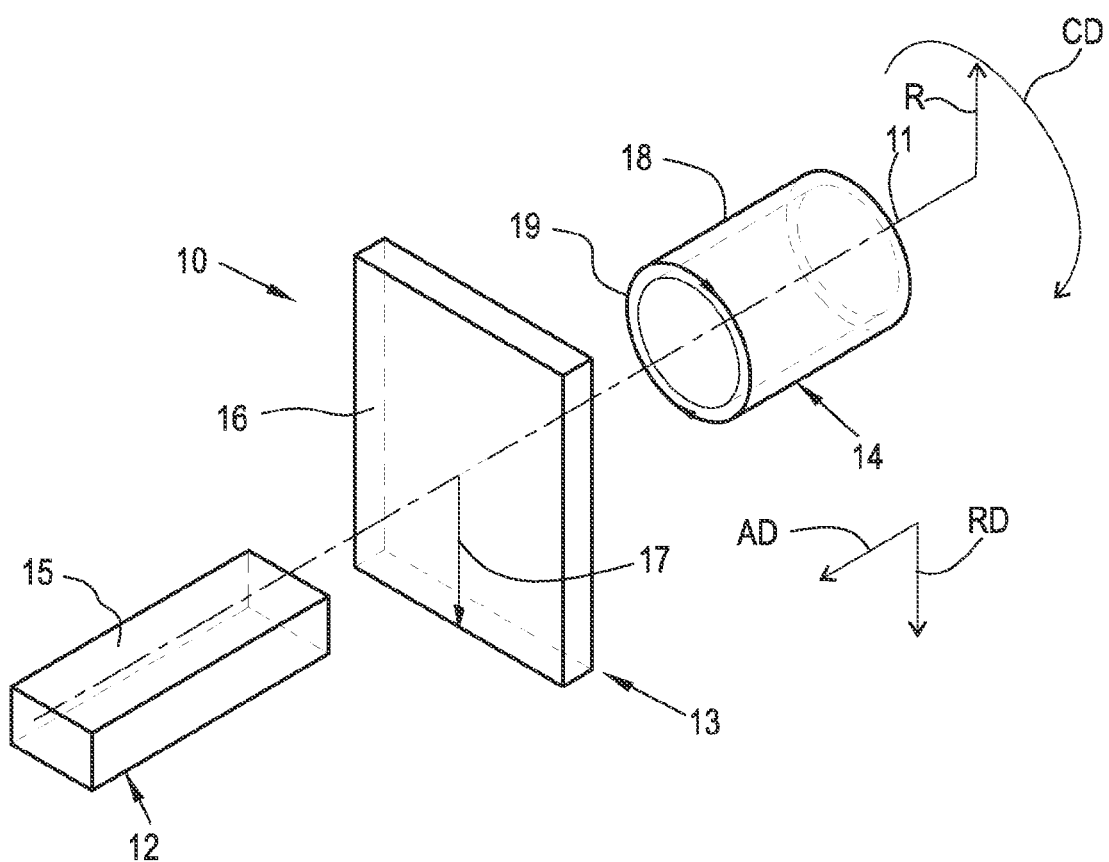
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
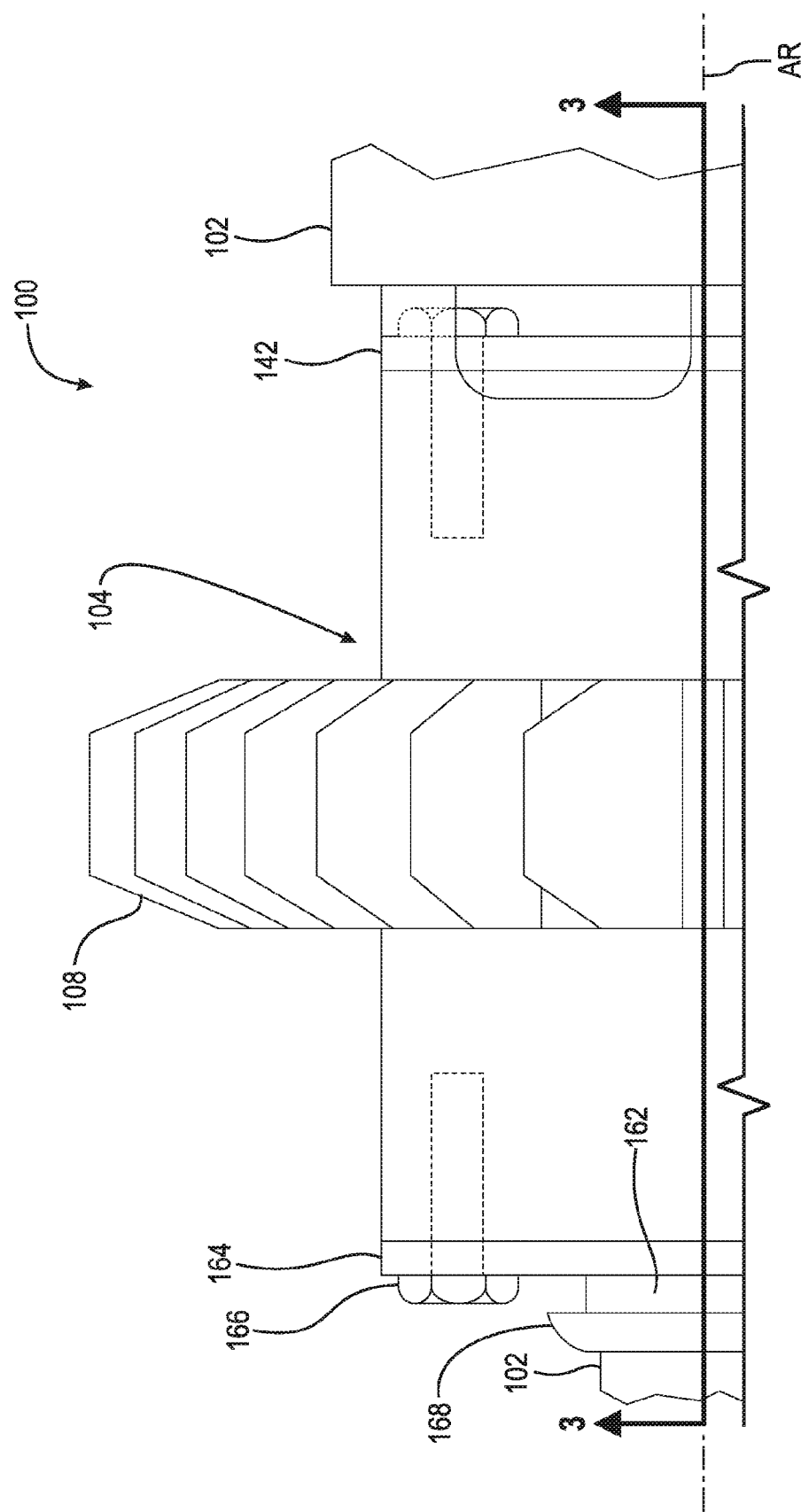
FIG. 2 is a top view of a camshaft assembly with a camshaft phaser, having two one-way wedge clutches with rotatable hubs.

FIG. 2 is a top view of camshaft assembly 100 with a camshaft phasing having two one-way wedge clutches with rotatable hubs in an advance mode.

Figure 3:
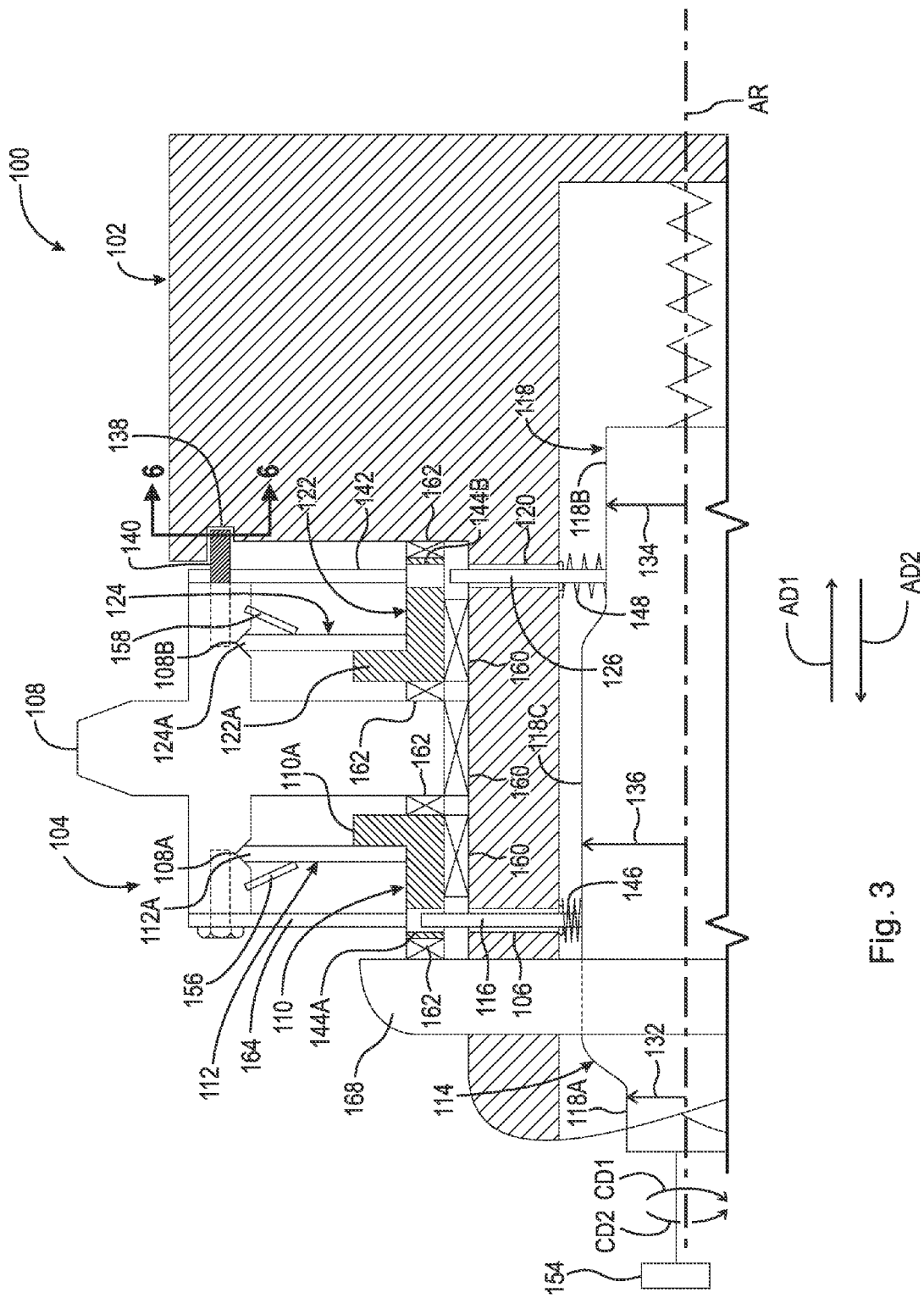
FIG. 3 is cross-sectional view generally along line 3-3 in FIG. 2 with the camshaft phaser in an advance mode.

FIG. 3 is cross-sectional view generally along line 3-3 in FIG. 2 with the camshaft phaser in an advance mode.

Figure 4:
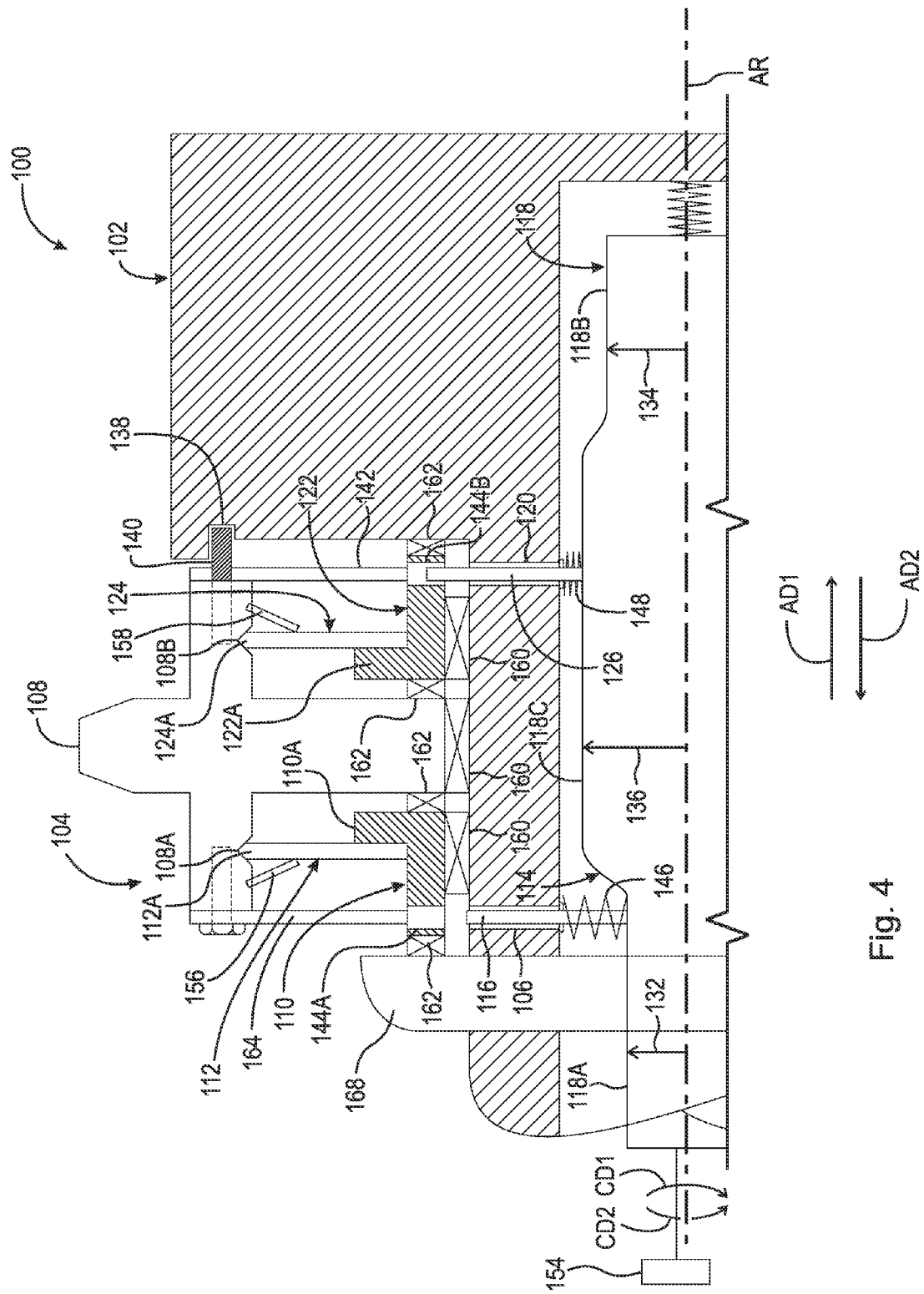
FIG. 4 is a cross-sectional view of the camshaft assembly in FIG. 3 in a retard mode.

FIG. 4 is a cross-sectional view of camshaft assembly 100 in FIG. 3 in a retard mode. The following should be viewed in light of FIGS. 2 through 4. Assembly 100 includes: axis of rotation AR; camshaft 102 and camshaft phaser 104. Camshaft 102 includes advance channel 106. Phaser 104 includes: input component 108 arranged to receive torque from an engine (not shown); advance hub 110; advance wedge plate 112 radially disposed between input component 108 and advance hub 110; and actuation assembly 114. Assembly 114 includes: advance pin 116 disposed in advance channel 106; and actuator pin 118. Radially outermost portion 112A of wedge plate 112 is in frictional contact with input component 108, for example with chamfered groove 108A. In an example embodiment, component 108 is an input gear.

For the discussion that follows, input component 108 rotates in direction CD1. For an advance mode: actuator pin 118 is arranged to radially displace advance pin 116 into non-rotatable connection with advance hub 110; camshaft 102 is arranged to rotate, with respect to input gear 108, in circumferential direction CD1; and advance hub 106 is arranged to block rotation of the camshaft, with respect to the input gear, in circumferential direction CD2, opposite circumferential direction CD1.

Camshaft 102 includes retard channel 120. Phaser 100 includes: retard hub 122; and retard wedge plate 124 radially disposed between input component 108 and retard hub 122. Assembly 114 includes retard pin 126 disposed in channel 120. Radially outermost portion 124A of wedge plate 124 is in frictional contact with input component 108, for example with chamfered groove 108B. For a retard mode: actuator pin 118 is arranged to radially displace retard pin 126 into non-rotatable connection with retard hub 122; camshaft 102 is arranged to rotate, with respect to input component 108, in circumferential direction CD2; and retard hub 122 is arranged to block rotation of the camshaft, with respect to the input component, in circumferential direction CD1.

Figure 5A:
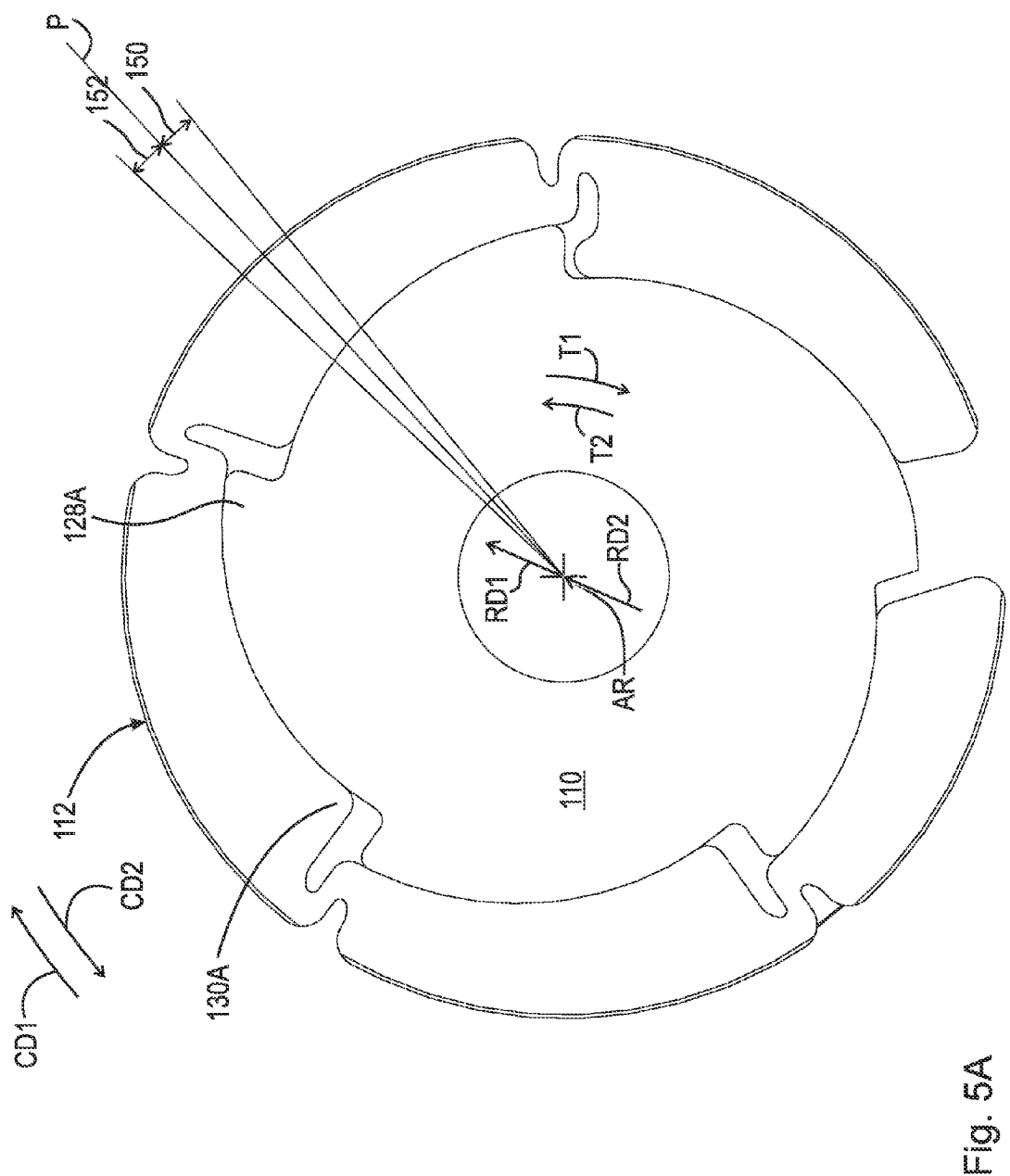
FIG. 5A is front view of an advance hub and an advance wedge plate shown in FIG. 3.

FIG. 5A is front view of advance hub 110 and advance wedge plate 112 shown in FIG. 3. Advance hub 110 includes ramps 128A extending radially outward in direction RD1 along circumferential direction CD1. Advance wedge plate 112 includes ramps 130A extending radially inward in radial direction RD2 along circumferential direction CD2 and engaged with ramps 128A. For the advance mode and for rotation of the camshaft, with respect to the input component, in circumferential direction CD1 (further described below), ramps 128A and 130A are arranged to circumferentially displace with respect to each other so that plate 112 contracts in radial direction RD2 and hub 110 rotates with respect to gear 108 in direction CD1. For example, the frictional engagement of wedge plate 112 and gear 108 rotates wedge plate 112 and ramps 130A in direction CD2 and ramps 128A, rotating in direction CD1, slide "down" ramps 130A in direction CD1. Since the radially inward retraction of plate 112 lessens the frictional engagement of gear 108 and plate 112, hub 110 and plate 112 are able to rotate with respect to gear 108 in direction CD1.

For the advance mode and rotation of the camshaft, with respect to the input component, in circumferential direction CD2 (further described below), ramps 128A and 130A are arranged to circumferentially displace with respect to each other to displace wedge plate 112 radially outward to non-rotatably connect the input component, advance wedge plate 112, and advance hub 110, preventing rotation of hub 110, with respect to input component 108, in direction CD2. For example, the frictional engagement of wedge plate 112 and input component 108 rotates wedge plate 112 and ramps 130A in direction CD1. As ramps 128A rotate in direction CD2 with respect to ramps 130A, the more radially outward portions of ramps 128A and engage and push the more radially inward portions of ramps 130A in direction RD1, pushing portion 112A radially outward.

Figure 5B:
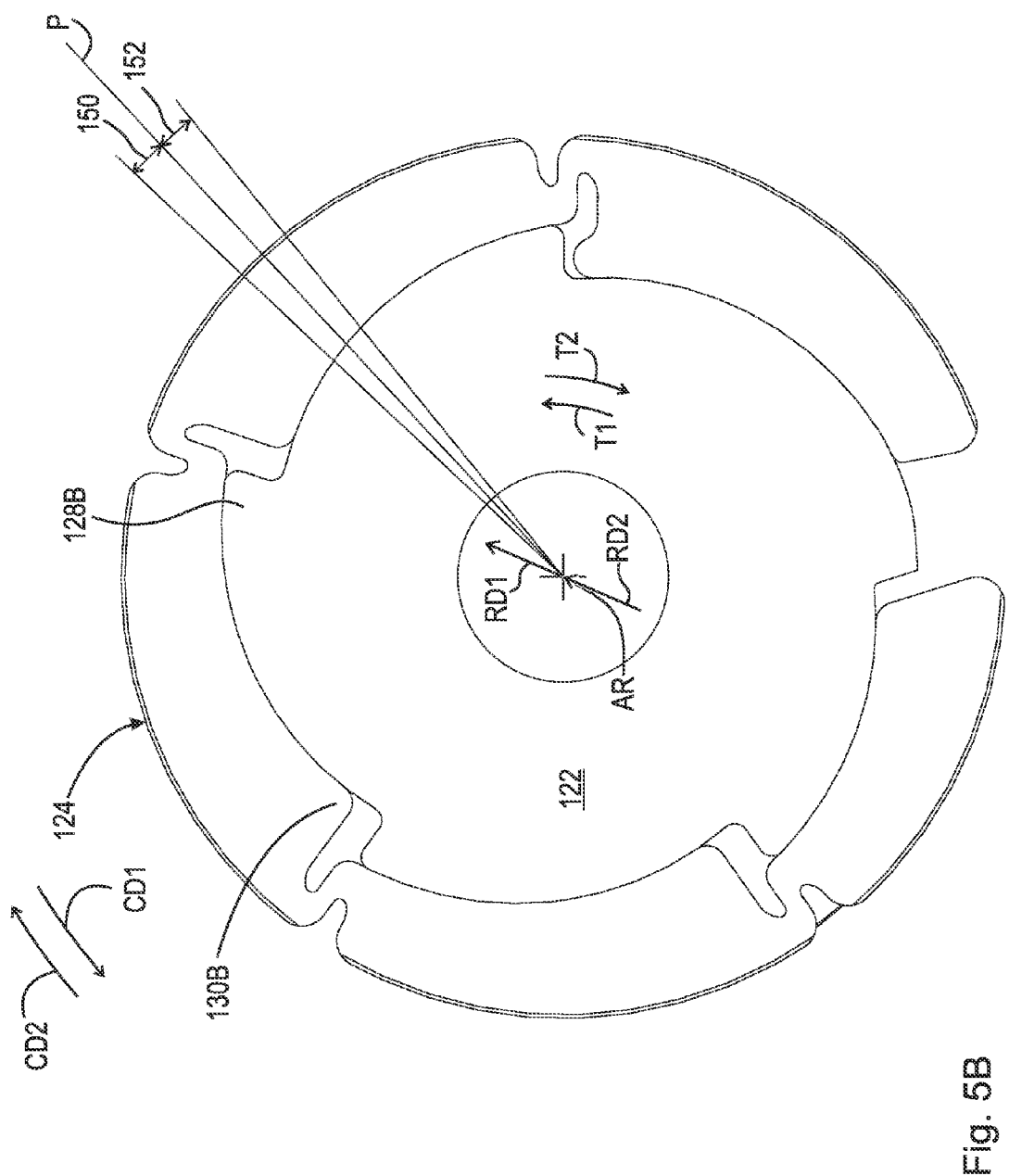
FIG. 5B is back view of a retard hub and a retard wedge plate shown in FIG. 3.

FIG. 5B is back view of retard hub 122 and retard wedge plate 124 shown in FIG. 3. Retard hub 122 includes ramps 128B extending radially outward in direction RD1 along circumferential direction CD2. Retard wedge plate 124 includes ramps 130B extending radially inward in radial direction RD2 along circumferential direction CD1 and engaged with ramps 128B.

For the retard mode and rotation of the camshaft, with respect to the input component, in circumferential direction CD2 (further described below), ramps 128B and 130B are arranged to circumferentially displace with respect to each other so that plate 124 contracts in radial direction RD2 and hub 122 rotates with respect to plate 124 and input component 108. For example, the frictional engagement of wedge plate 124 and input component 108 rotates wedge plate 124 and ramps 130B in direction CD1 and ramps 128B, rotating in direction CD2, slide "down" ramps 130B in direction CD2. Since the radially inward retraction of plate 124 lessens the frictional engagement of gear 108 and plate 124, hub 122 and plate 124 are able to rotate with respect to gear 108 in direction CD2.

For the retard mode and rotation of the camshaft, with respect to the input component, in circumferential direction CD1 (further described below), ramps 128B and 130B are arranged to circumferentially displace with respect to each other to displace wedge plate 124 radially outward to non-rotatably connect the input component, retard wedge plate 124, and retard hub 122, preventing rotation of hub 122, with respect to input component 108, in direction CD1. For example, the frictional engagement of wedge plate 124 and input component 108 rotates wedge plate 124 and ramps 130B in direction CD2. As ramps 128B rotate in direction CD1 with respect to ramps 130B, the more radially outward portions of ramps 128B and engage and push the more radially inward portions of ramps 130B in direction RD1, pushing portion 124A radially outward.

For the advance mode, retard hub 122 is rotatable with respect to retard pin 126 or input component 108. For example, pin 126 is radially inward of hub 122 so that pin 126 is not engaged with hub 122. For the retard mode, advance hub 110 is rotatable with respect to advance pin 116 or input component 108. For example, pin 116 is radially inward of hub 110 so that pin 116 is not engaged with hub 110.

In an example embodiment, actuator pin 118 includes: portions 118A and 118B: outer radii 132 and 134, respectively; and portion 118C having outer radius 136 greater than radii 132 and 134, respectively. For the advance mode, actuator pin 118 is displaceable so that portions 118C and 118B directly engage advance pin 116 and retard pin 126, respectively. For the retard mode, actuator pin 118 is displaceable so that portions 118A and 118C directly engage advance pin 116 and retard pin 126, respectively.

Figure 6:
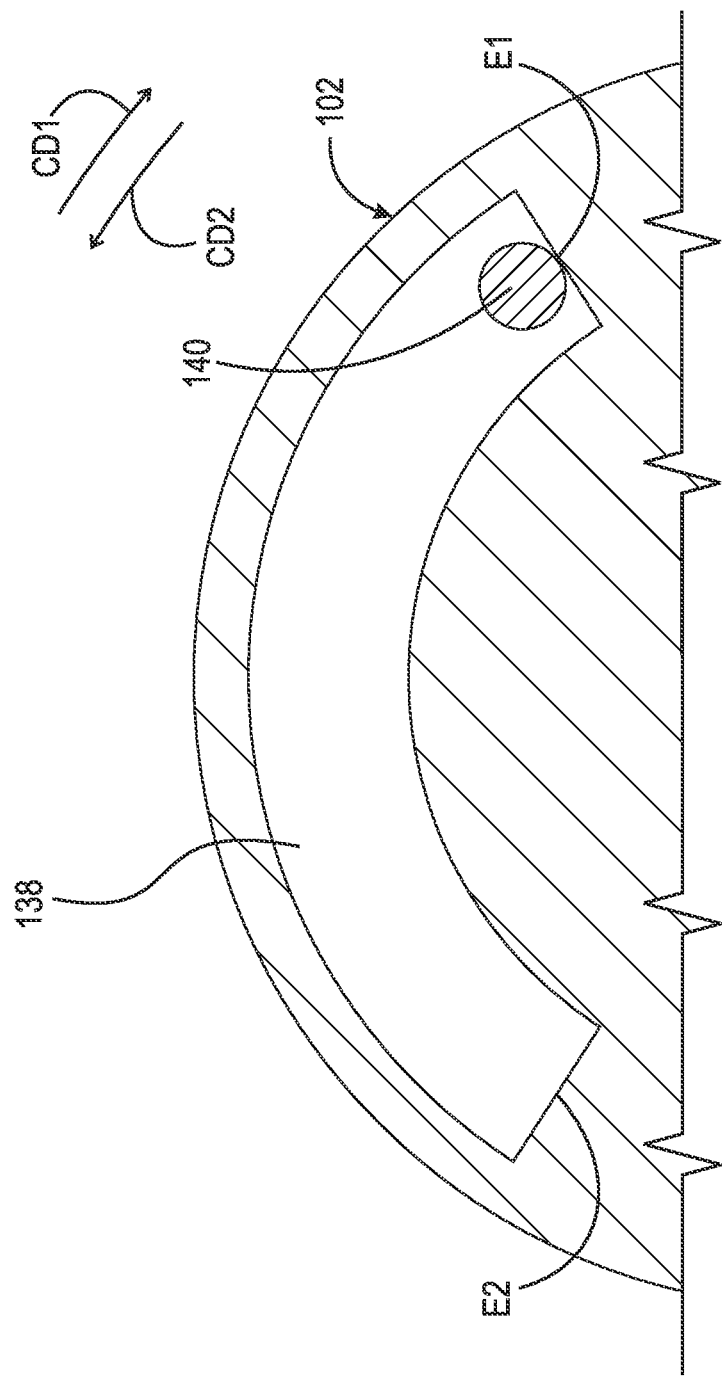
FIG. 6 is a cross-sectional view generally along line 6-6 in FIG. 3.

FIG. 6 is a cross-sectional view generally along line 6-6 in FIG. 3. In an example embodiment, camshaft 102 includes at least one slot 138 and phaser 104 includes at least one pin 140 non-rotatably connected to cover 142 and disposed in slot(s) 138. Slot 138 includes ends E1 and E2. Each pin 140 and each respective slot 138 act as stops for the rotation of camshaft 102, with respect to gear 108, in directions CD1 and CD2. For example, in the advance mode, once camshaft 102 rotates far enough, with respect to gear 108, end E1 contacts pin 140 to prevent further rotation of camshaft 102, with respect to gear 108, in direction CD1. For example, in the retard mode, once camshaft 102 rotates far enough, with respect to gear 108, end E2 contacts pin 140 to prevent further rotation of camshaft 102, with respect to gear 108, in direction CD2.

Figure 7:
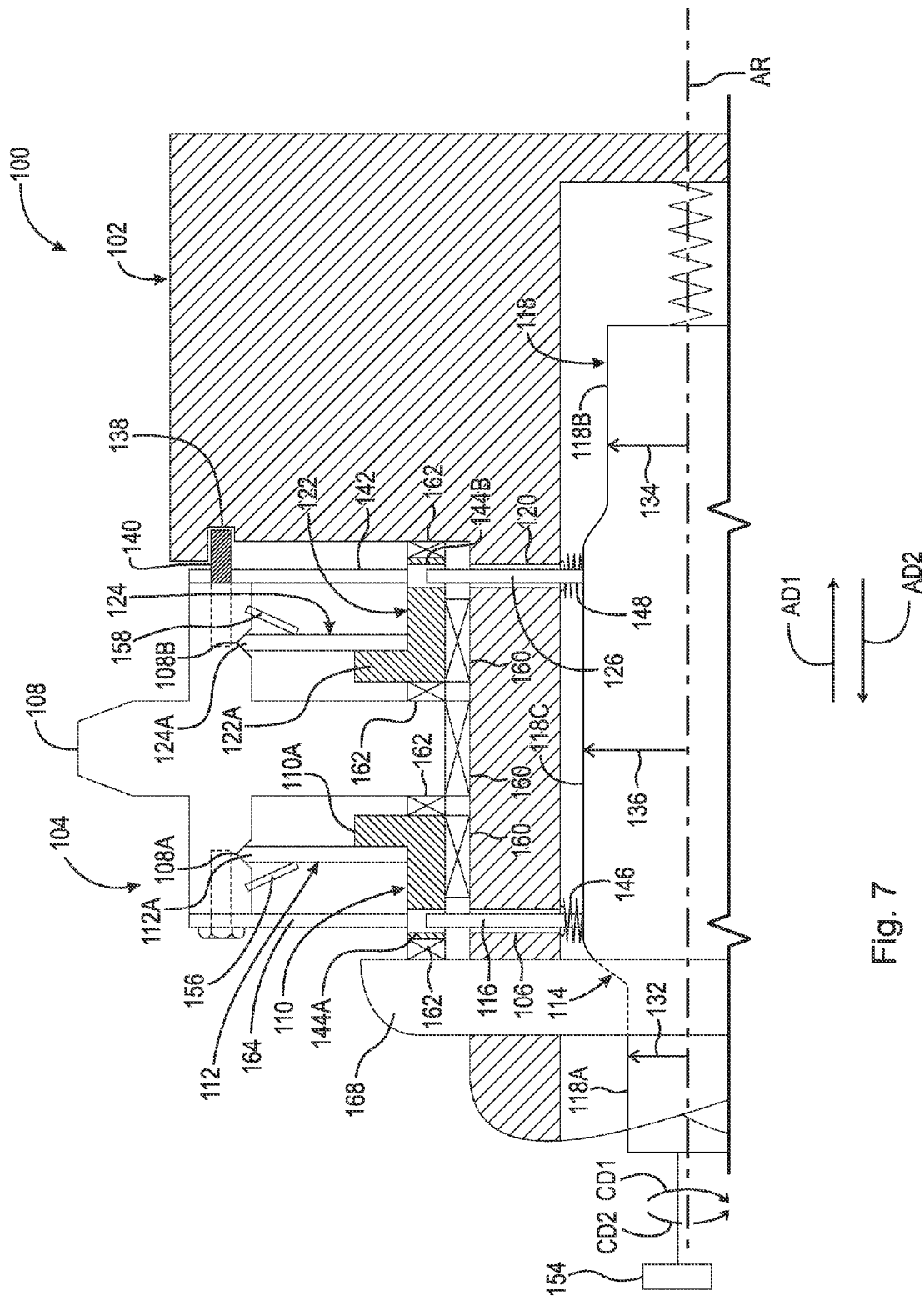
FIG. 7 is a cross-sectional view of the camshaft assembly in FIG. 3 in a drive mode.

FIG. 7 is a cross-sectional view of camshaft assembly 104 in FIG. 3 in a drive mode.

In an example embodiment, phaser 100 operates in only the advance mode or the retard mode. However, once phaser 100 is in the full advance or retard mode, phaser 100 can be locked in a drive mode. For the drive mode, actuator pin 118 is displaceable so that portion 118C directly engages both advance pin 116 and retard pin 126. Thus, in the drive mode both hub 110 and hub 122 are non-rotatably connected to camshaft 102. As a result, the rotational position of camshaft 102 with respect to input component 108 is substantially fixed. For example: a relative rotation of hub 110, with respect to wedge plate 112 in direction CD2, of less than one degree is needed to non-rotatably connect hub 110, wedge plate 112 and gear 108; and: a relative rotation of hub 122, with respect to wedge plate 124 in direction CD1, of less than one degree is needed to non-rotatably connect hub 122, wedge plate 124 and input component 108.

Figure 8:
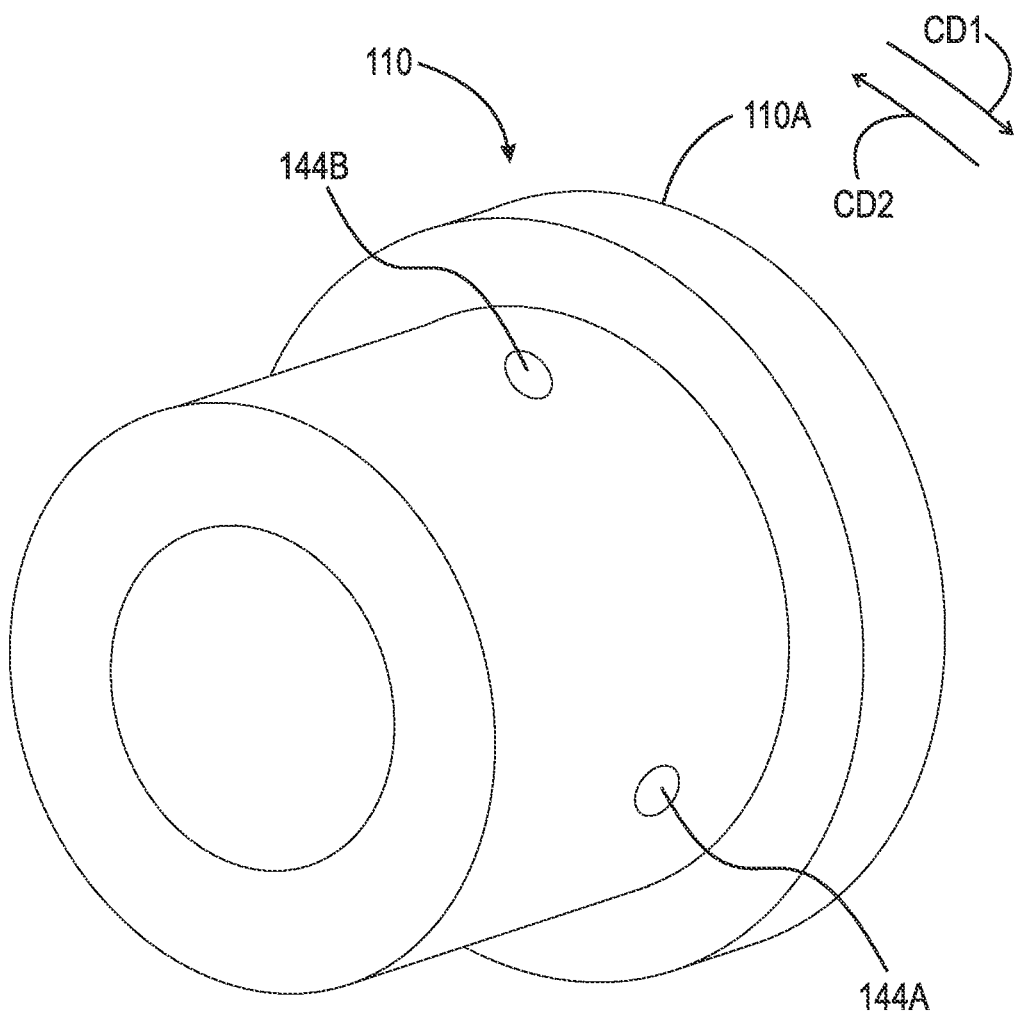
FIG. 8 is a front perspective view of the advance hub shown in FIG. 3.

FIG. 8 is a front perspective view of an example advance hub 110 shown in FIG. 3.

Figure 9:
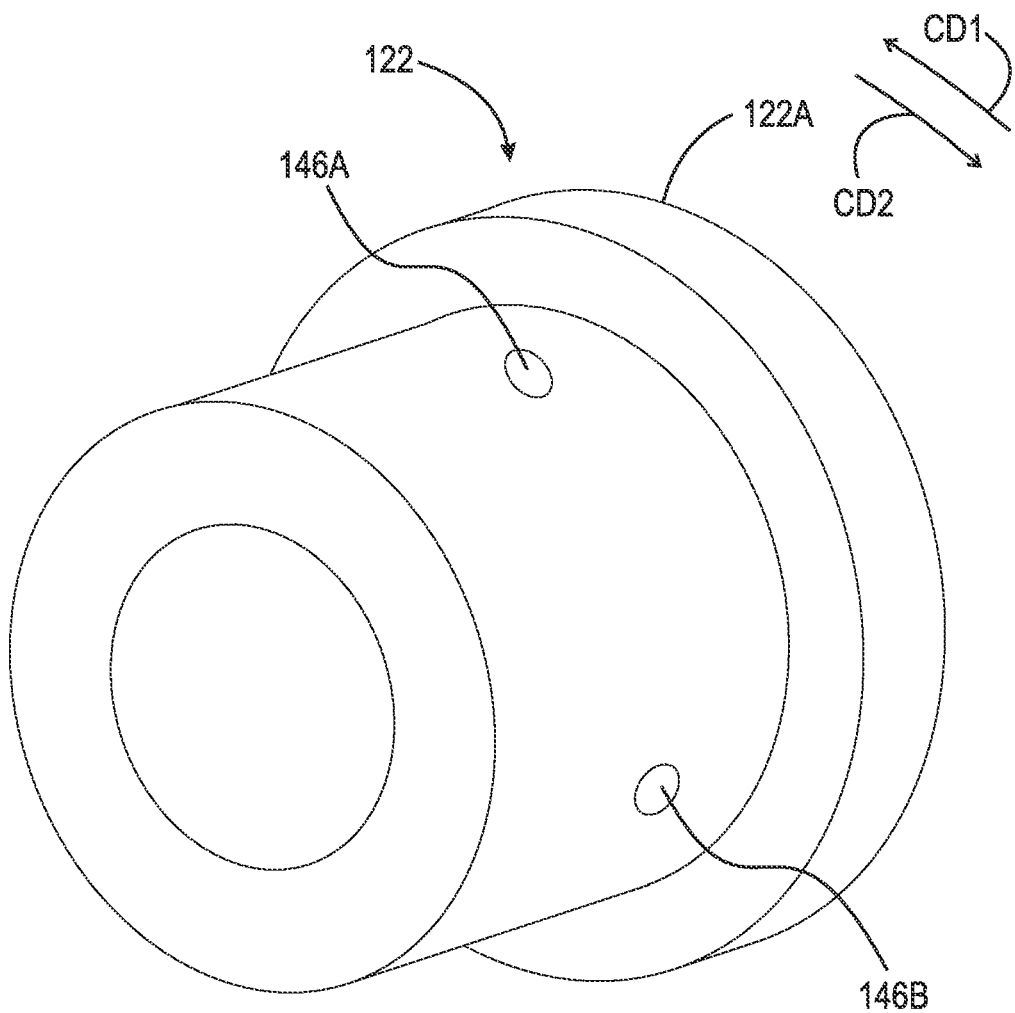
FIG. 9 is a back perspective view of the retard hub shown in FIG. 3.

FIG. 9 is a back perspective view of an example retard hub 122 shown in FIG. 3. In an example embodiment: hub 110 includes channels 144A and 144B; and hub 122 includes channels 146A and 146B. As an example, to initiate the advance mode starting at the retard mode: pin 116 is inserted into channel 144A to non-rotatably connect hub 110 and camshaft 102; and pin 126 is radially withdrawn from channel 146A. As noted above, in the advance mode, hub 122 is rotatable with respect to camshaft 102, and the frictional engagement of wedge plate 124 and gear 108 rotates plate 124 and hub 122 in direction CD1. The position of channel 146B is selected such that pin 126 radially aligns with channel 146B when the full advance mode is reached, for example, end E1 contacts pin 140. At that point pin 126 can be displaced into channel 146B to initiate the drive mode.

As an example, to initiate the retard mode starting at the advance mode: pin 126 is inserted into channel 146B to non-rotatably connect hub 122 and camshaft 102; and pin 116 is radially withdrawn from channel 144A. As noted above, in the retard mode, hub 110 is rotatable with respect to camshaft 102, and the frictional engagement of wedge plate 112 and input component 108 rotates plate 112 and hub 110 in direction CD2. The position of channel 144B is selected such that pin 116 radially aligns with channel 144B when the full retard mode is reached, for example, end E2 contacts pin 140. At that point pin 116 can be displaced into channel 144B to initiate the drive mode.

Figure 10:
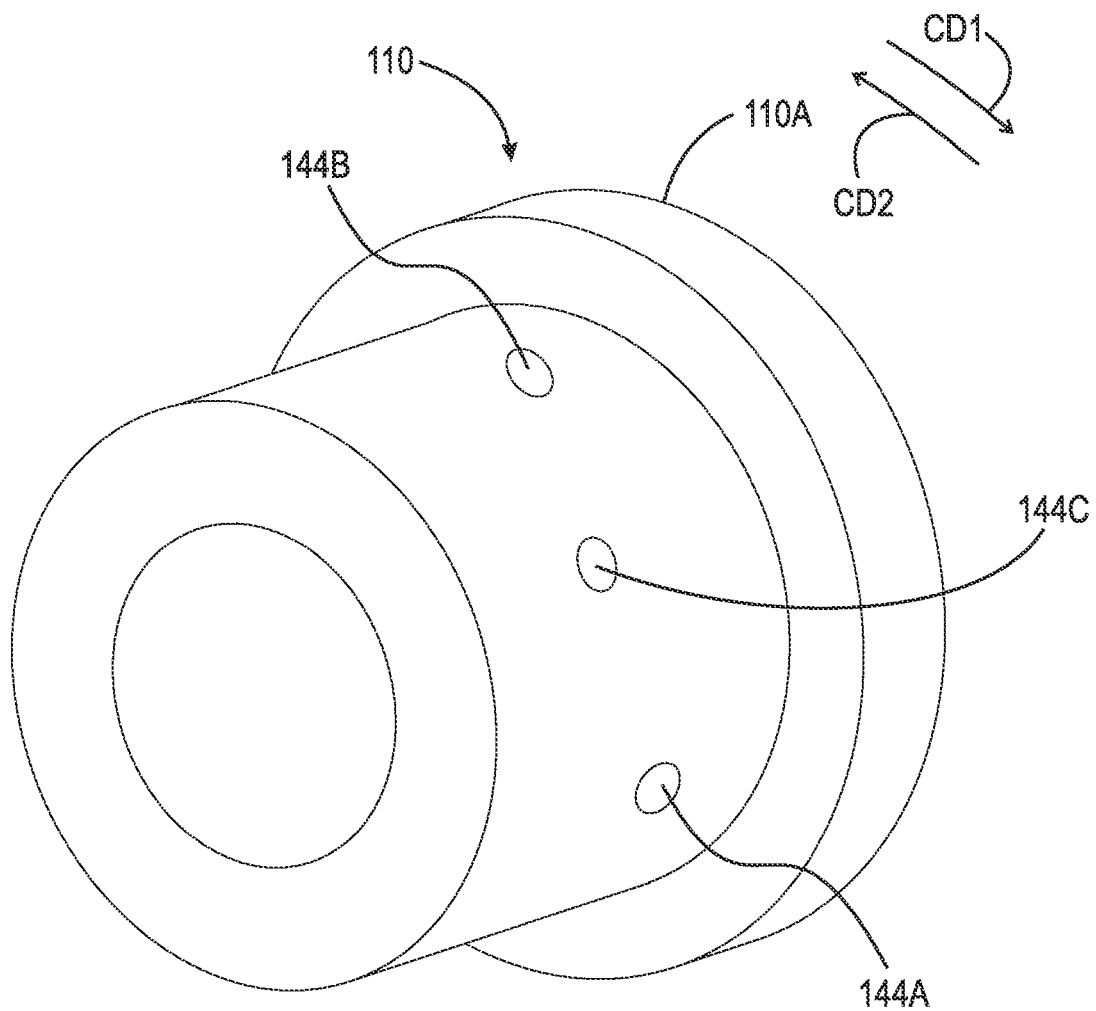
FIG. 10 is a front perspective view of an example advance hub shown in FIG. 3 with a mid-lock position; and, FIG. 11 is a back perspective view of an example retard hub shown in FIG. 3 with a mid-lock position.

FIG. 10 is a front perspective view of an example advance hub 110 shown in FIG. 3 with a mid-lock position.

Figure 11:
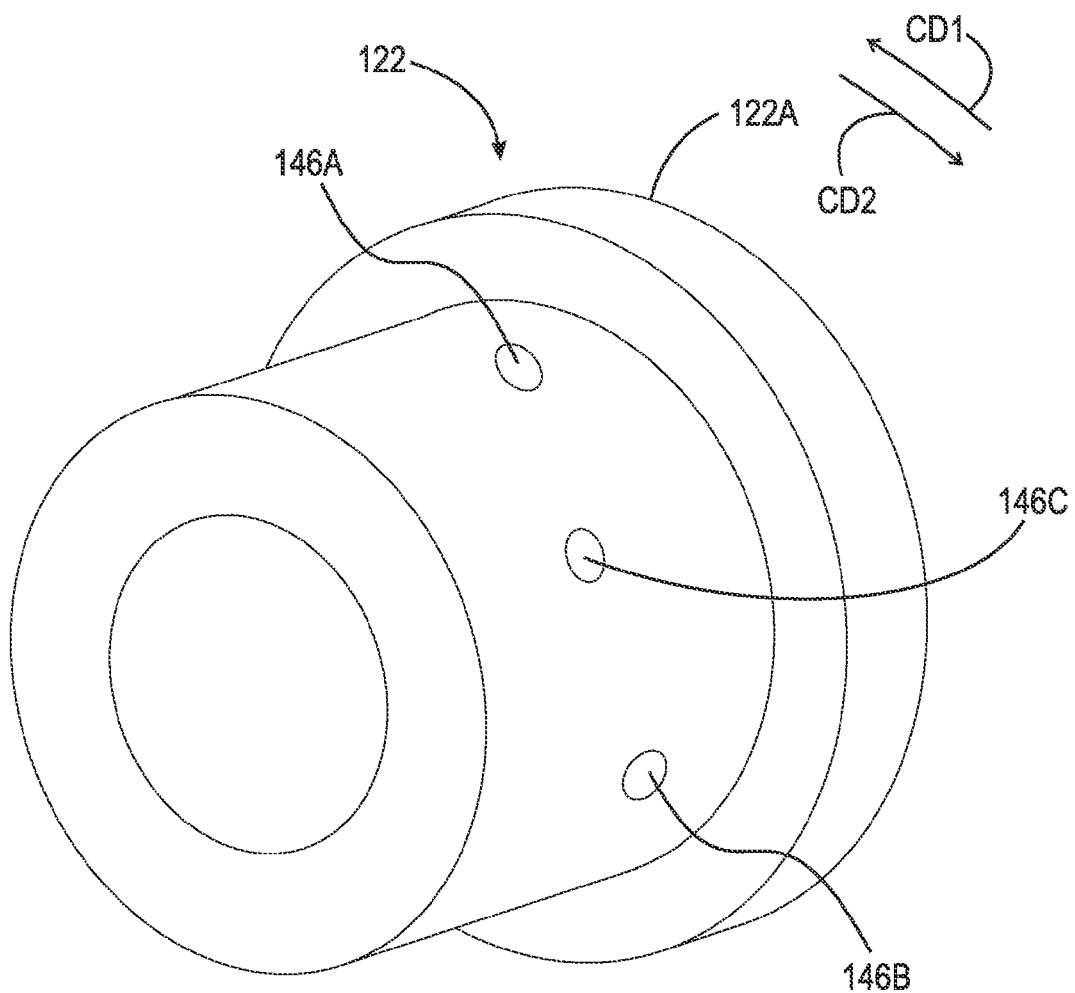

FIG. 11 is a back perspective view of an example retard hub 122 shown in FIG. 3 with a mid-lock position. In an example embodiment: hub 110 includes channels 144A, 144B, and 144C; and hub 122 includes channels 146A, 146B, and 146C. The discussion for the advance and retard modes is applicable to channels 144A, 144B, 146A, and 146B. Channels 114C and 146C provide mid-lock positions between the fully advance and fully retard modes. For example, to initiate a mid-lock mode starting at the retard mode: pin 116 is inserted into channel 144A to non-rotatably connect hub 110 and camshaft 102; and pin 126 is radially withdrawn from channel 146A. As noted above, in the advance mode, hub 122 is rotatable with respect to camshaft 102, and the frictional engagement of wedge plate 124 and input component 108 rotates plate 124 and hub 122 in direction CD1. The position of channel 146C is selected such that pin 126 radially aligns with channel 146C in the mid-lock position. At that point pin 126 can be displaced into channel 146C to initiate the drive mode.

For example, to initiate a mid-lock position starting at the advance mode: pin 126 is inserted into channel 146B to non-rotatably connect hub 122 and camshaft 102, and pin 116 is radially withdrawn from channel 144A. As noted above, in the advance mode, hub 110 is rotatable with respect to camshaft 102, and the frictional engagement of wedge plate 112 and input component 108 rotates plate 112 and hub 110 in direction CD2. The position of channel 144C is selected such that pin 116 radially aligns with channel 144C when the mid-lock position is reached. At that point pin 116 can be displaced into channel 144C to initiate the drive mode. It should be understood that hubs 110 and 122 can include multiple mid-lock channels.

In an example embodiment, phaser 104 includes resilient elements 146 and 148 engaged with pins 116 and 126, respectively. For the retard mode, element 146 is arranged displace advance pin 116 radially inward of advance hub 110 so that hub 110 is rotatable with respect to camshaft 102. For the advance mode, element 148 is arranged to displace retard pin 126 radially inward of retard hub 122 so that hub 122 is rotatable with respect to camshaft 102.

As is known in the art, torsional forces T1 and T2 are generated by camshaft 102, in directions CD1 and CD2, respectively. The torsional force forces are due to interaction of cam lobes (not shown) on camshaft 102 with various components of a valve train (not shown) of which camshaft 102 is a part. Torsional forces T1 and T2 are transmitted in a repeating cycle. Wedge plates 112 and 124 rotate in direction CD1 (due to torque from gear 108). For the advance mode, torsional force T1 urges hub 110 in direction CD1 with respect to wedge plate 112 and torsional force T2 urges hub 110 in direction CD2 with respect to wedge plate 112. During operation, input component 108 and wedge plates 112 and 124 are always rotating in direction CD1. However, unchecked, torque T1 and T2 cause: in the advance mode, camshaft 102 and hub 110 to speed up relative to input component 108; and in the retard mode, camshaft 102 and hub 122 to slow down relative to input component 108.

In the advance mode, camshaft 102, hub 112, and wedge plate 112 are rotatable in direction CD1 with respect to gear 108. Therefore, each iteration of force T1 causes relative rotation of camshaft 102 and hub 110 by amount 150 (from assumed starting point P) with respect to gear 108, in direction CD1. Each iteration of force T2 non-rotatably connects input component 108, wedge plate 112, hub 110, and camshaft 102, preventing rotation of camshaft 102, with respect to input component 108, in direction CD2. Thus, for every cycle of forces T1 and T2, camshaft 102 rotates by amount 150 in direction CD1.

In the retard mode, camshaft 102, hub 122, and wedge plate 124 are rotatable in direction CD2 with respect to gear 108. Therefore, each iteration of force T2 causes relative rotation of camshaft 102 and hub 122 by amount 152 (from assumed starting point P) with respect to input component 108, in direction CD2. Each iteration of force T1 non-rotatably connect input component 108, wedge plate 124, hub 122, and camshaft 102, preventing rotation of camshaft 102, with respect to input component 108, in direction CD1. Thus, for every cycle of forces T1 and T2, camshaft 102 rotates by amount 152 in direction CD2.

Since both hubs 110 and 122 are non-rotatably connected to camshaft 102 in the drive mode, the effect of forces T1 and T2 is substantially neutralized in the drive mode. For example, for each iteration of force T1, a very nominal rotation of hub 122 in direction CD1 non-rotatably connects input component 108, wedge plate 124, hub 122, and camshaft 102, preventing rotation of camshaft 102, with respect to input component 108, in direction CD1. For example, for each iteration of force T2, a very nominal rotation of hub 110 in direction CD2 non-rotatably connects input component 108, wedge plate 112, hub 110, and camshaft 102, preventing rotation of camshaft 102, with respect to input component 108, in direction CD2. The nominal rotation noted above is significantly smaller than distance 150 or distance 152. For example, distances 150 and 152 are greater than one degree of rotation for hub 110 and 122, respectively, and the nominal rotation is less than one degree of rotation for hub 110 and 112, respectively.

In an example embodiment, phaser 104 includes actuator 154 (schematically represented in FIGS. 3, 4, and 6) arranged to displace pin 118 in axial directions AD1 and AD2 to control respective positions of portions 118A, 118B, and 118C as described above. Actuator 154 can be any actuator known in the art, including but not limited to, a hydraulic actuator, a mechanical actuator, an electric actuator, or a pneumatic actuator.

In an example embodiment, phaser 104 includes resilient elements 156 and 158 arranged to urge wedge plates 112 and 124 in axial directions AD1 and AD2, respectively, for example, into contact with portions 110A and 122A of hubs 110 and 122, respectively. Elements 156 and 158 maintain respective axial positions of wedge plates 112 and 124, respectively.

In an example embodiment, phaser 104 includes: cover 142, radial bearings 160; thrust bearings 162; and cover 164. Covers 142 and 164 are fixed to input component 108 by any means known in the art, for example, bolts 166. In an example embodiment, nut 168 secures phaser 104 to camshaft 102.

The following should be viewed in light of FIGS. 2 through 11. The following describes a method for phasing a camshaft. A first step receives, using an input component for a camshaft phaser, torque from an engine. A second step, for an advance mode: radially displaces, with an actuator pin for an actuator assembly, an advance pin into non-rotatable connection with an advance hub for the camshaft phaser, the actuator pin located in an advance channel in the camshaft; rotates the camshaft, with respect to the input component, in a first circumferential direction; and blocks, with the advance hub, rotation of the camshaft, with respect to the input component, in a second circumferential direction, opposite the first circumferential direction. A third step, for an advance mode: axially displaces the actuator pin; radially displaces, with the actuator pin, a retard pin into non-rotatable connection with a retard hub for the camshaft phaser, the retard pin located in a retard channel in the camshaft; rotates the camshaft, with respect to the input component, in a second circumferential direction, opposite the first circumferential direction; and blocks, with the retard hub, rotation of the camshaft, with respect to the input component, in the first circumferential direction.

A fourth step, for the advance mode: engages a first plurality of ramps, for the advance hub, extending radially outward along the first circumferential direction with a second plurality of ramps, for an advance wedge plate radially located between the input component and the advance hub, extending radially inward in the second circumferential direction; for rotation of the camshaft, with respect to the input component, in the second circumferential direction, circumferentially displaces the first and second pluralities of ramps with respect to each other; and displaces the advance wedge plate radially outward to non-rotatably connect the input component, the advance wedge plate, and the advance hub.

A fifth step, for the retard mode: engages a first plurality of ramps, for the retard hub, extending radially outward along the second circumferential direction with a second plurality of ramps, for a retard wedge plate radially located between the input component and the retard hub, extending radially inward in the second circumferential direction; for rotation of the camshaft, with respect to the input component, in the second circumferential direction, circumferentially displaces the first and second pluralities of ramps with respect to each other; and displaces the retard wedge plate radially outward to non-rotatably connect the input component, the retard wedge plate, and the retard hub.

Advantageously, camshaft assembly 100 and a method of phasing a camshaft presented above address the problems noted above regarding phase control of a camshaft in an engine having limited availability of hydraulic fluid. For example, phaser 104 does not use hydraulic fluid to phase camshaft 102.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A camshaft phaser, comprising:
   an input component arranged to receive torque from an engine;
   an advance hub;
   an advance wedge plate radially disposed between the input component and the advance hub; and,
   an actuation assembly including:
      an advance pin arranged to be disposed in an advance channel for a camshaft; and,
      an actuator pin, wherein:
   for an advance mode:
      the actuator pin is arranged to radially displace the advance pin into non-rotatable connection with the advance hub;
      the advance hub is arranged to rotate, with respect to the input component, in a first circumferential direction; and,
      the advance wedge plate is arranged to block rotation of the advance hub, with respect to the input component, in a second circumferential direction, opposite the first circumferential direction.

2. The camshaft phaser of claim 1, wherein:
   the advance hub includes a first plurality of ramps extending radially outward along the first circumferential direction; p1 the advance wedge plate includes a second plurality of ramps extending radially inward along the second circumferential direction and engaged with the first plurality of ramps; and.
   for rotation of the advance hub, with respect to the input component, in the second circumferential direction, the first and second pluralities of ramps are arranged to circumferentially displace with respect to each other to displace the advance wedge plate radially outward to non- rotalably connect the input component, the advance wedge plate, and the advance hub.

3. THe camshaft phaser of claim 1, further comprising:
   a retard hub; and
   a retard wedge plate radially disposed between the input component and the retard hub, wherein:
      the actuation assembly includes a retard pin arranged to be disposed in a retard channel for the camshaft; and,
   for a retard mode:
      the actuator pin is arrange dto radially displace the retard pin into non-rotatable connection with the retard hub;
      the retard hub is arranged to rotate, with respect to the input component, in the second circumferential direction; and,
      the retard wedge plate is arranged to block rotation of the retard hub, with respect to the input component, in the first circumferential direction.

4. The camshaft assembly of claim 3, wherein:
   the retard hub includes a first plurality of ramps extending radially outward a long the second circumferential direction;
   the retard wedge plate includes a secondary plurality of ramps extending radially inward along the first circumferential direction and engaged with the first plurality of ramps; and
   for tation of the camshaft, with respect to the input components, in the first circumferential direciton, the first and second pluralities of ramps are arranged to circumferentially displace with respect to each other to displace the retard wedge plate radially outward to non-rotatably connect the input component, the retard wedge plate, and the advance hub.

5. The camshaft assembly of claim3, wherein:
   for the advance mode, the retard hub is rotatable with respect to the reatd pin or the input component; and,
   for the retard mode, the advance hub is rotatable with respect to the advance pin or the input component.

6. The camshaft assembly of claim 3, wherein:
   the actuator pin includes:
      first and second portions having first and second outer radii, respectively; and,
      a third portion having a third outer radius greater than the first and second radii, respectively;
   for the advance mode, the actuator pin is displaceable so that the third and second portions directly engage the advance and retard pins, respectively; and,
   for the retard mode, the actuator pin is displaceable so that the first and third portions directly engage the advance and retard pins, respectively.

7. The camshaft assembly of claim 6, wherein for a drive mode:
   the actuator pin is displaceable so that the third portion directly engages the advance and retard pins;
   the advance and retard pins are non-rotatably connected to the advance and retard hubs, respectively, and,
   the advance and retard hubs each transmit torque from the input component.

8. The camshaft assembly of claim 7, wherein:
   the input component is arranged to rotate in the first circumferential direction;
   the camshaft is arranged to rotate with respect to the input component in the first and second circumferential directions during first and second alternating time periods; and,
   for the drive mode:
      during the first time period, the retard hub is arranged to transmit torque from the input component to the camshaft; and,
      during the second time period, the advance hub is arranged to transmit torque from the input component to the camshaft.

9. The camshaft assembly of claim 3, wherein the camshaft phaser includes:
   a first resilient element arranged to, for the retard mode, displace the advance pin radially inward of the advance hub; and, a second resilient element arranged to, for the advance mode, displace the retard pin radially inward of the retard hub.

10. A camshaft assembly, comprising:
a camshaft including an advance channel and a retard channel; and,
a camshaft phaser including:
an advance hub;
a retard hub; and,
an actuation assembly including:
an advance pin disposed in the advance channel;
a retard pin disposed in the retard channel; and,
an actuator pin, wherein:
for an advance mode:
the actuator pin is arranged to radially displace the advance pin into non-rotatable connection with the advance hub;
the camshaft is arranged to rotate, with respect to the input component, in a first circumferential direction; and,
the advance hub is arranged to block rotation of the camshaft, with respect to the input component, in a second circumferential direction, opposite the first circumferential direction; and,
for a retard mode:
the actuator pin is arranged to radially displace the retard pin into non-rotatable connection with the retard hub;
the camshaft is arranged to rotate, with respect to the input component, in the second circumferential direction; and,
the retard hub is arranged to block rotation of the camshaft, with respect to the input component in the first circumferential direction.

11. The camshaft assembly of claim 10, wherein:
the camshaft phaser includes an advance wedge plate radially disposed between the input component and the advance hub;
the advance hub includes a first plurality of ramps extending radially outward along the first circumferential direction;
the advance wedge plate includes a second plurality of ramps extending radially inward along the second circumferential direction and engaged with the first plurality of ramps; and,
for rotation of the camshaft, with respect to the input component, in the second circumferential direction, the first and second pluralities of ramps are arranged to circumferentially displace with respect to each other to displace the advance wedge plate radially outward to non-rotatably connect the input component, the advance wedge plate, and the advance hub.

12. The camshaft assembly of claim 10, wherein:
the camshaft phaser includes a retard wedge plate radially disposed between the input component and the retard hub;
the retard hub includes a first plurality of ramps extending radially outward along the second circumferential direction;
the retard wedge plate includes a second plurality of ramps extending radially inward in the first circumferential direction and engaged with the first plurality of ramps; and,
for rotation of the camshaft, with respect to the input component, in the first circumferential direction, the first and second pluralities of ramps are arranged to circumferentially displace with respect to each other to displace the retard wedge plate radially outward to non-rotatably connect the input component, the retard wedge plate, and the advance hub.

13. The camshaft assembly of claim 10, wherein:
for the advance mode, the retard hub is rotatable with respect to the retard pin or the input component; and,
for the retard mode, the advance hub is rotatable with respect to the advance pin or the input component.

14. The camshaft assembly of claim 10, wherein:
the actuator pin includes:
first and second portions having first and second outer radii, respectively; and,
a third portion having a third outer radius greater than the first and second radii, respectively;
for the advance mode, the actuator pin is displaceable so that the third and second portions directly engage the advance and retard pins, respectively; and,
for the retard mode, the actuator pin is displaceable so that the first and third portions directly engage the advance and retard pins, respectively.

15. The camshaft assembly of claim 14, wherein for a drive mode:
the actuator pin is displaceable so that the third portion directly engages the advance and retard pins;
the advance and retard pins are non-rotatably connected to the advance and retard hubs, respectively, and,
the advance and retard hubs each transmit torque from the input component to the camshaft.

16. The camshaft assembly of claim 15, wherein:
the input component is arranged to rotate in the first circumferential direction;
the camshaft is arranged to rotate with respect to the input component in the first and second circumferential directions during first and second alternating time periods; and,
for the drive mode:
during the first time period, the retard hub is arranged to transmit torque from the input component to the camshaft; and,
during the second time period, the advance hub is arranged to transmit torque from the input component to the camshaft.

17. The camshaft assembly of claim 10, wherein the camshaft phaser includes:
a first resilient element arranged to, for the retard mode, displace the advance pin radially inward of the advance hub; and,
a second resilient element arranged to, for the advance mode, displace the retard pin radially inward of the retard hub.

18. A method of phasing a camshaft, comprising:
receiving, using an input component for a camshaft phaser, torque from an engine;
for an advance mode:
radially displacing, with an actuator pin for an actuator assembly, an advance pin into non-rotatable connection with an advance hub for the camshaft phaser, the actuator pin located in an advance channel in the camshaft;
rotating the camshaft, with respect to the input component, in a first circumferential direction; and,
blocking, with the advance hub, rotation of the camshaft, with respect to the input component, in a second circumferential direction, opposite the first circumferential direction; and,
for a retard mode:
axially displacing the actuator pin;

radially displacing, with the actuator pin, a retard pin into non-rotatable connection with a retard hub for the camshaft phaser, the retard pin located in a retard channel in the camshaft;

rotating the camshaft, with respect to the input component, in a second circumferential direction, opposite the first circumferential direction; and, blocking, with the retard hub, rotation of the camshaft, with respect to the input component, in the first circumferential direction.

19. The camshaft assembly of claim 18, further comprising:

for the advance mode:
engaging a first plurality of ramps, for the advance hub, extending radially outward along the first circumferential direction with a second plurality of ramps, for an advance wedge plate radially located between the input component and the advance hub, extending radially inward in the second circumferential direction;

for rotation of the camshaft, with respect to the input component, in the second circumferential direction, circumferentially displacing the first and second pluralities of ramps with respect to each other; and, displacing the advance wedge plate radially outward to non-rotatably connect the input component, the advance wedge plate, and the advance hub.

20. The camshaft assembly of claim 18, further comprising:

for the retard mode:
engaging a first plurality of ramps, for the retard hub, extending radially outward along the second circumferential direction with a second plurality of ramps, for an advance wedge plate radially located between the input component and the advance hub, extending radially inward in the first circumferential direction;

for rotation of the camshaft, with respect to the input component, in the first circumferential direction, circumferentially displacing the first and second pluralities of ramps with respect to each other; and, displacing the advance wedge plate radially outward to non-rotatably connect the input component, the advance wedge plate, and the advance hub.

* * * * *

UNITED STATES PATENT AND TRADEMARK OFFICE
CERTIFICATE OF CORRECTION

PATENT NO. : 9,771,837 B2  
APPLICATION NO. : 14/941726  
DATED : September 26, 2017  
INVENTOR(S) : Eric Berndt Page 1 of 1

It is certified that error appears in the above-identified patent and that said Letters Patent is hereby corrected as shown below:

In the Claims

Column 9, Line 47, "direction; p1 the" should be --direction; the--

Column 9, Line 58, "THe camshaft phaser" should be --The camshaft phaser--

Column 9, Line 65, "arrange dto" should be --arranged to--

Column 10, Line 9, "a long" should be --along--

Column 10, Line 15, "for tation" should be --for rotation--

Column 10, Line 16, "direciton" should be --direction--

Column 10, Line 22, "claim3" should be --claim 3--

Signed and Sealed this  
Eighteenth Day of February, 2020

Andrei Iancu  
*Director of the United States Patent and Trademark Office*